United States Patent [19]

Delage et al.

[11] Patent Number: 5,514,445

[45] Date of Patent: May 7, 1996

[54] HONEYCOMB STRUCTURE OF THERMOSTRUCTURAL COMPOSITE MATERIAL

[75] Inventors: André Delage, Le Pian Medoc; Jean-Michel Georges, Gradignan; Jean-Pierre Maumus, Cenon, all of France

[73] Assignee: Societe Europeenne de Propulsion, Suresnes, France

[21] Appl. No.: 378,624

[22] Filed: Jan. 26, 1995

Related U.S. Application Data

[62] Division of Ser. No. 68,738, May 28, 1993, Pat. No. 5,415,715.

[30] Foreign Application Priority Data

Jun. 4, 1992 [FR] France .................................. 92 06790

[51] Int. Cl.$^6$ ........................................................ B32B 3/12
[52] U.S. Cl. ........................... 428/116; 428/118; 428/136
[58] Field of Search ..................................... 428/116, 118, 428/136

[56] References Cited

U.S. PATENT DOCUMENTS

| | | | |
|---|---|---|---|
| 1,917,456 | 7/1933 | Mickelson | 428/136 |
| 3,188,924 | 6/1965 | Davey | 493/42 |
| 3,321,355 | 5/1967 | Holland | 156/197 X |
| 3,756,907 | 9/1973 | Heling | 156/229 X |
| 4,628,846 | 12/1986 | Vives | 112/262.1 |
| 5,247,749 | 9/1993 | Bury | 428/116 X |
| 5,415,715 | 5/1993 | Delage et al. | 428/116 X |

FOREIGN PATENT DOCUMENTS

| | | |
|---|---|---|
| 3729633 | 3/1989 | Germany . |
| WO9116277 | 10/1991 | WIPO . |

OTHER PUBLICATIONS

Database WPIL, Section Ch. Week 8925, Derwent Publications Ltd., London, GB, Class L02, AN 89-181962 & JP-A-1,119,574 (Showa Hikoki Kogyo), May 11, 1989.

Primary Examiner—Henry F. Epstein
Attorney, Agent, or Firm—Weingarten, Schurgin, Gagnebin & Hayes

[57] ABSTRACT

A method of manufacturing a honeycomb structure of thermostructural composite material comprising a fiber reinforcing fabric densified by a matrix, the fibers of the reinforcing fabric being of a material selected from carbon and ceramics, as is the matrix, the method comprising the following steps:

making a three-dimensional fiber fabric by means of superposed two-dimensional plies that are bonded together by means of fibers passing through the plies;

making slit-shaped cuts in a staggered configuration through the plies, and through the entire thickness of the fabric;

stretching the cut fabric in a direction that is not parallel to the cuts but that is parallel to the plies so as to form cells whose walls are constituted by the lips of the cuts; and while the cut texture is held in the stretched state, densifying it using the matrix-constituting material to obtain a rigid honeycomb structure of thermostructural material.

4 Claims, 5 Drawing Sheets

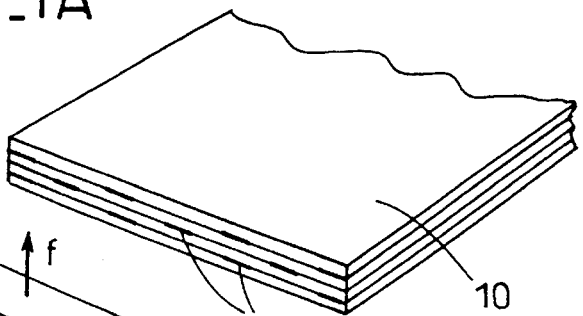
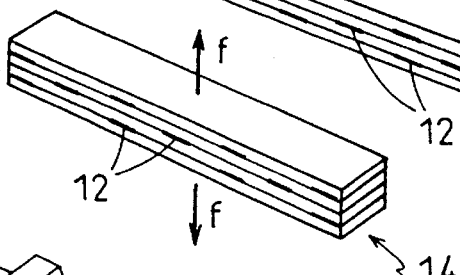
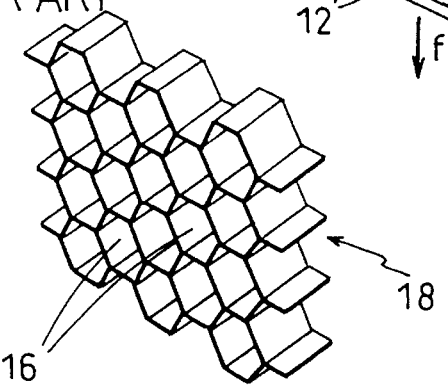
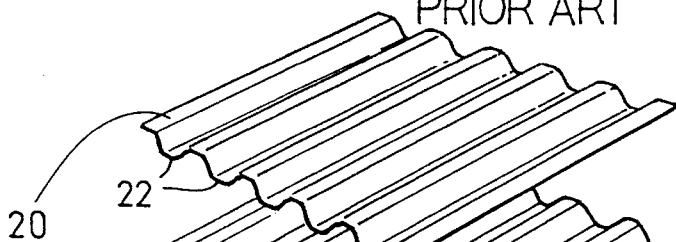
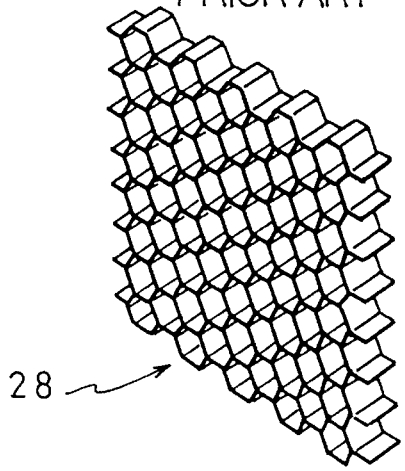

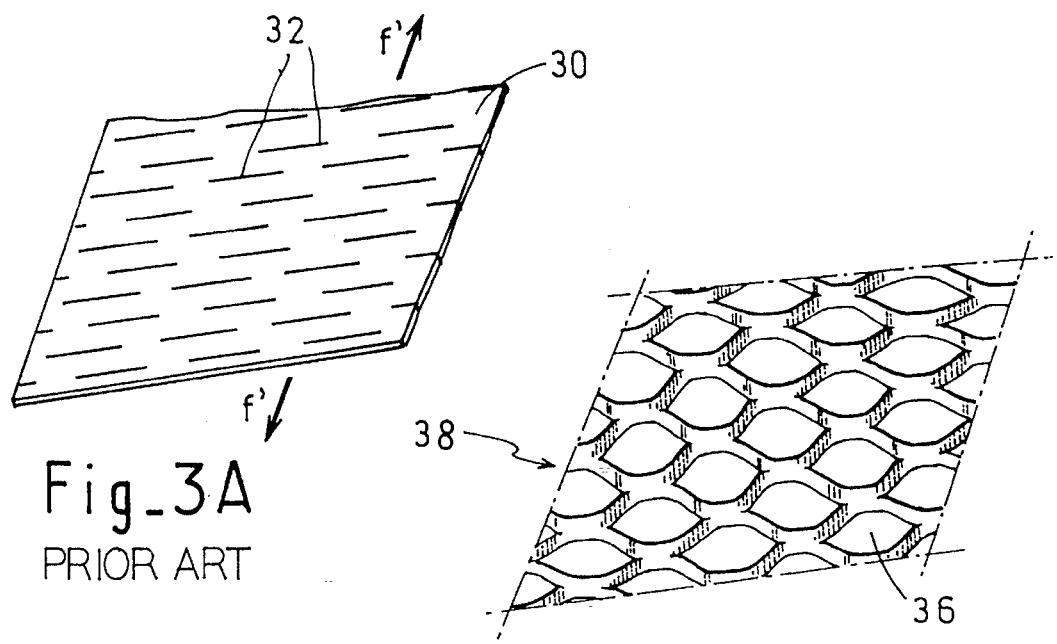
Fig_3A PRIOR ART
Fig_3B PRIOR ART
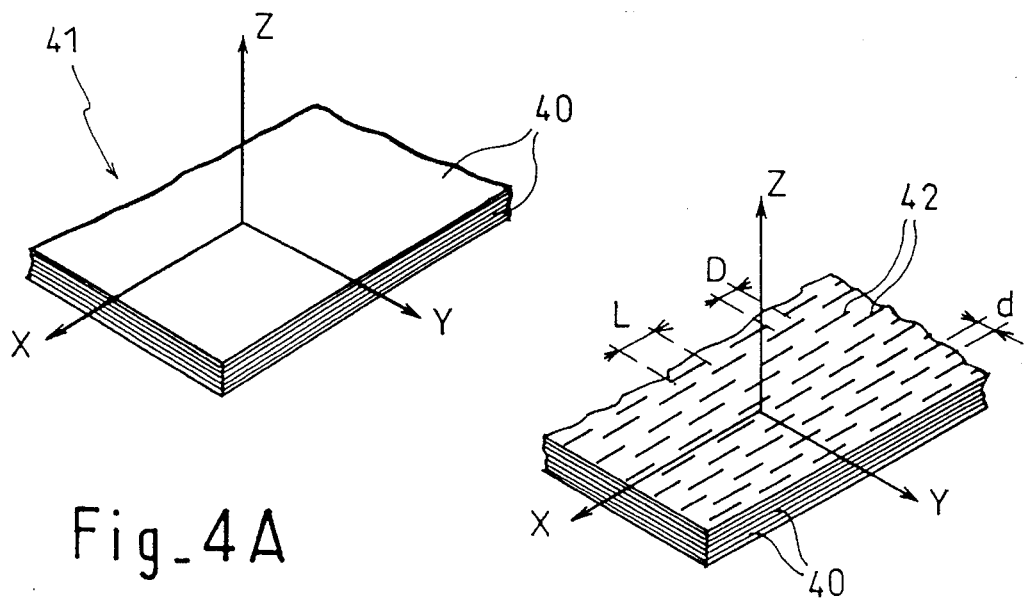
Fig_4A
Fig_4B

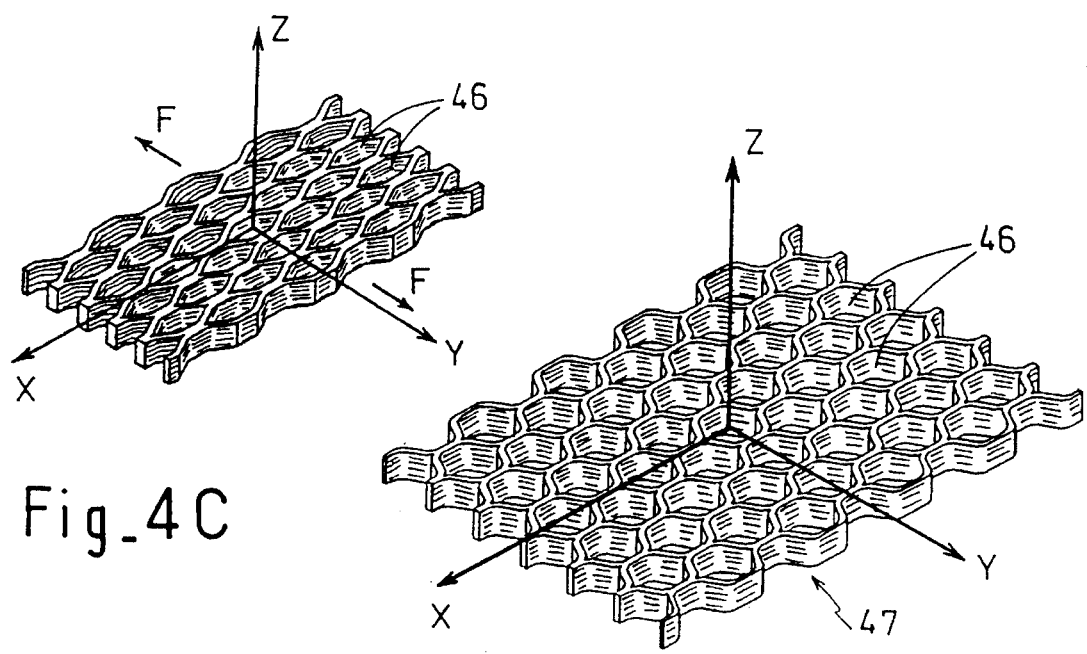
Fig_4C
Fig_4D
Fig_4E
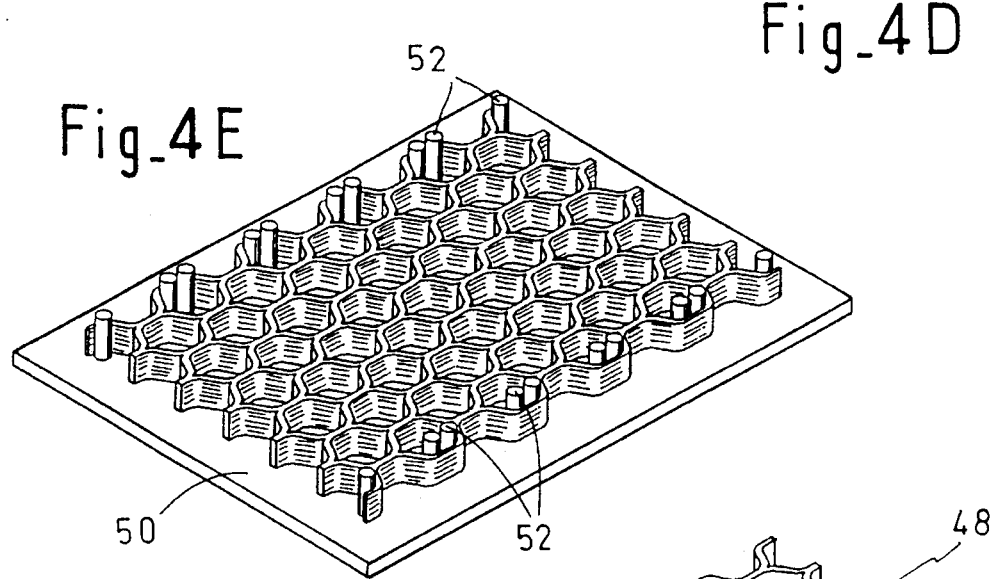
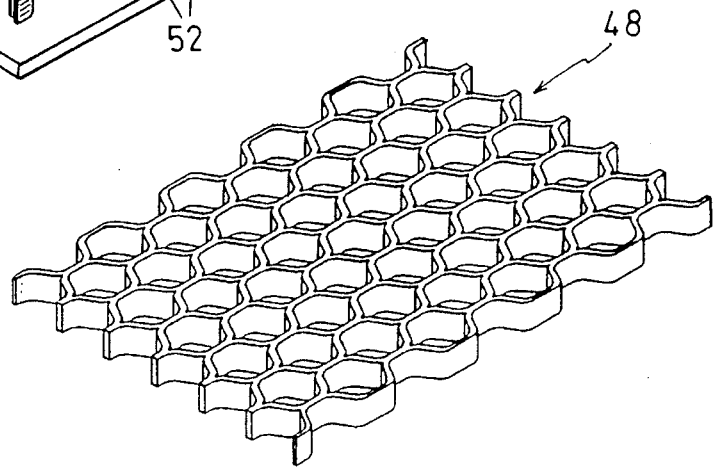
Fig_4F

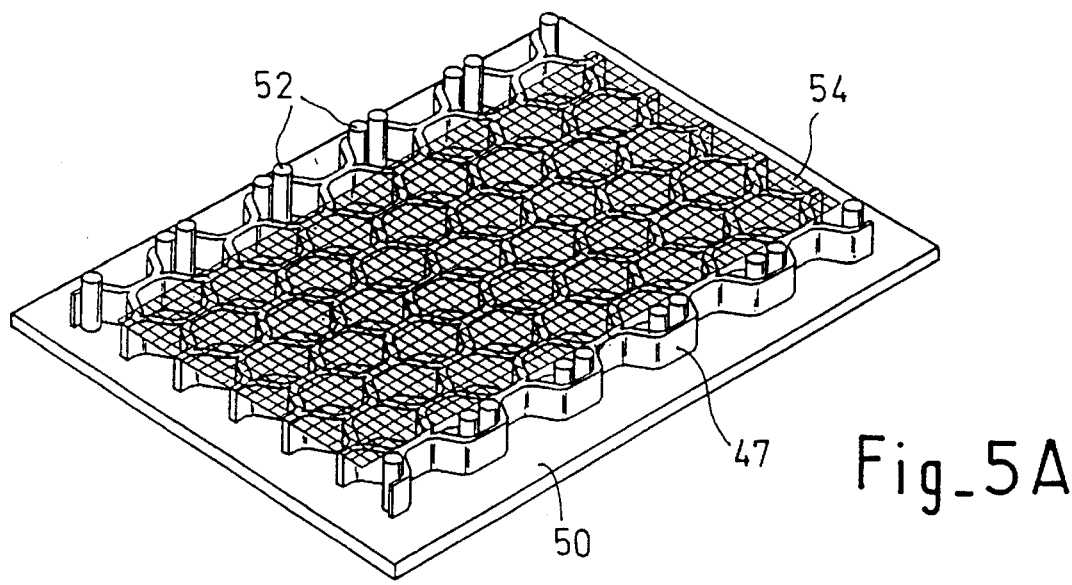
Fig_5A
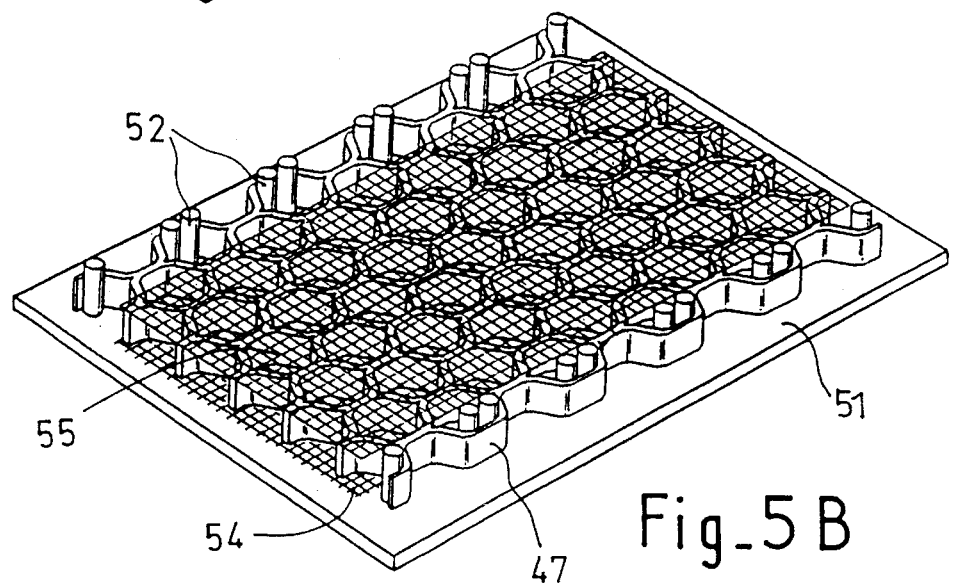
Fig_5B
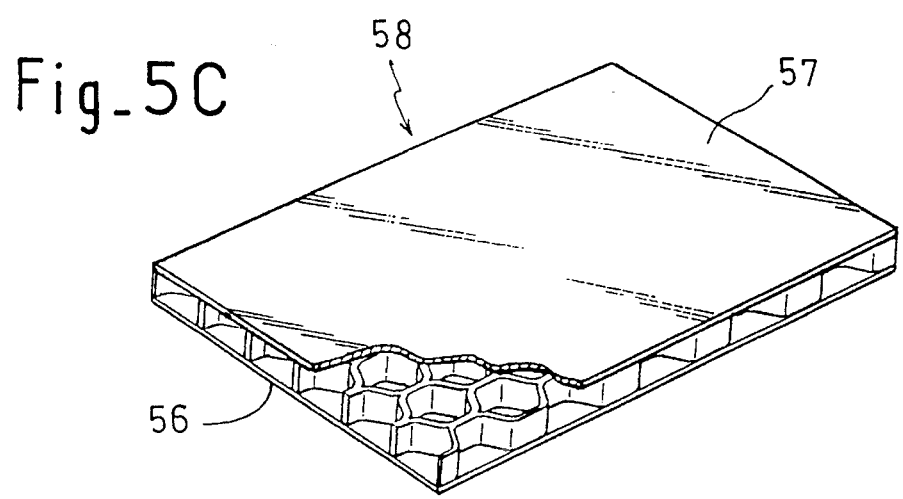
Fig_5C

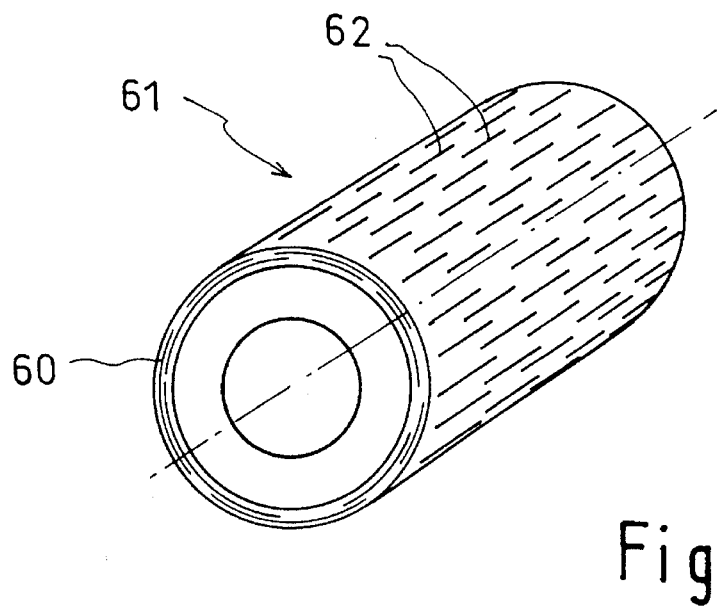
Fig_6A
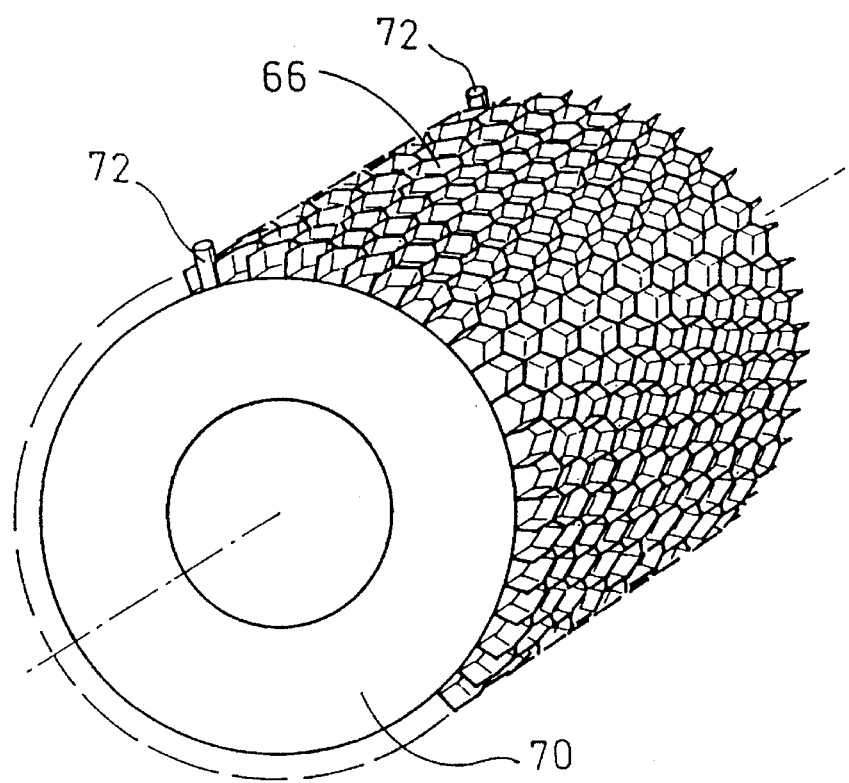
Fig_6B

HONEYCOMB STRUCTURE OF THERMOSTRUCTURAL COMPOSITE MATERIAL

RELATED APPLICATION

This application is a divisional of U.S. application Ser. No. 08/068,738, filed May 28, 1993 now U.S. Pat. No. 5,415,715.

FIELD OF THE INVENTION

The present invention relates to the manufacture of honeycomb structures of thermostructural composite material.

BACKGROUND OF THE INVENTION

Thermostructural composite materials are characterized by their mechanical properties that make them suitable for constituting structural elements and by their ability to conserve their mechanical properties at high temperatures. Typical thermostructural composite materials are carbon-carbon (C—C) composites and ceramic matrix composite (CMC) materials.

C—C composites are constituted by a reinforcing texture or "preform" of carbon fibers that is densified by a matrix of carbon. CMCs are constituted by a preform of refractory fibers (carbon fibers or ceramic fibers) densified by a ceramic matrix. A ceramic material commonly used for manufacturing CMCs is silicon carbide (SIC).

The preform of a C—C composite or of a CMC is made by stacking or draping unidirectional plies (sheets of mutually parallel yarns or cables) or multidirectional plies (pieces of woven cloth, webs of fibers, pieces of felt), or by winding yarns, tapes, or strips, or by three-dimensional weaving. When draping plies, they may be bonded together by needling, by sewing, or by implanting transverse threads. Preforms are made of ceramic or carbon fibers, or more generally of fibers made of a precursor of ceramic or carbon, with the precursor then being transformed after the textile operations required for manufacturing the preform have been completed.

The purpose of densifying a preform is to fill the accessible pores thereof with the matrix-forming material. Such densification can be implemented by impregnating the preform with a liquid that contains a precursor of the matrix material and then transforming the precursor, or by chemical vapor infiltration.

The techniques mentioned above for making fiber preforms out of carbon or ceramic, and for densifying them by means of a carbon matrix or a ceramic matrix are well known.

SUMMARY OF THE INVENTION

Several methods exist for manufacturing honeycomb structures.

A first known method (FIGS. 1A, 1B, and 1C) consists in stacking together sheets 10 and in gluing them together in a staggered configuration. Gluing takes place along parallel strips 12 with strips of glue situated on one face of a sheet being offset relative to strips of glue situated on its other face (FIG. 1A). The set of sheets is then cut up into slices 14 perpendicularly to the strips of glue. Each slice is then stretched in the direction normal to the faces of the sheets (arrows f in FIG. 1B) so as to obtain hexagonal cells 16 by deformation (FIG. 1C). A honeycomb panel 18 is then obtained, and metal or composite sheets may be stuck on its opposite faces.

Such a method is used for making metal honeycomb structures. The sheets 10 are cut out from sheet metal, and the cells 16 are produced by plastic deformation of the metal.

That method can also be implemented using sheets of card or of paper. In which case, after being stacked and glued in a staggered configuration, the sheets of paper may be impregnated with a resin, e.g. a phenolic resin. The resin is cured after the cells have been formed (which happens either before or after the set of sheets has been cut up into slices).

To make a honeycomb structure out of a thermostructural composite material, it would be possible to implement a method of the same type using two-dimensional fiber plies, e.g. plies of woven cloth that are stacked and glued in a staggered configuration. Densification and consequently rigidification of the structure would then be performed after stretching and cell formation. Each ply would normally be made up of a plurality of layers of cloth, thus requiring the layers in a given ply to be bonded together in order to prevent them separating during stretching. In addition, it is difficult to perform a gluing operation in a staggered configuration on cloth with the regularity and accuracy required for ensuring that cloth is not torn because of a local defect when stretching is applied. In addition, during the densification operation after stretching, there is a danger of thermal stresses rupturing the glue.

One solution would be to sew the plies of cloth together in a staggered configuration, instead of gluing them together, but although that would avoid certain drawbacks, it would also give rise to considerable difficulties of implementation.

A second known method (FIGS. 2A, 2B) consists in using corrugated sheets, e.g. of metal foil. The corrugated sheets 20 are superposed and glued or welded or soldered together along their touching facets 22 (FIG. 2A). Honeycomb panels 28 are obtained directly by slicing the block of sheets 20 perpendicularly to the corrugations (FIG. 2B).

That method can be used for making honeycomb structures out of composite material by using corrugated sheets that are themselves made of composite material. Such sheets can be obtained by draping layers of cloth so as to give them the desired corrugated shape and then densifying them, e.g. by draping and molding layers of cloth that have been preimpregnated with a resin or with some other liquid precursor for the matrix of the composite material, and then applying heat treatment. A method of that type is described in document WO 91/16277. However, it is then necessary to glue the corrugated sheets together in a manner that is effective and capable of withstanding the operating temperatures to which thermostructural materials may be subjected in use. In addition, the operations of prefabricating corrugated sheets are lengthy and expensive, thereby considerably increasing the cost of the honeycomb structure.

Finally, a third known method (FIGS. 3A and 3B) uses a sheet 30, e.g. a metal sheet, in which cuts 32 are formed. The cuts are formed in a staggered configuration along parallel lines (FIG. 3A). The cuts are of equal length and they are regularly spaced apart along each line. The cuts situated along one line are offset relative to those in the adjacent lines, and each cut extends over a length that is greater than the distance between two adjacent cuts in the same line. The sheet 30 is expanded by opening the cuts and forcing metal out of the plane of the sheet so as to form cells 36 at the locations of the cuts by plastic deformation of the metal (FIG. 3B). The expansion is limited so as to avoid generating stresses that could tear the sheet, particularly at the ends of the cuts 32. The axis of each cell is inclined relative to the initial plane of the sheet through an angle of less than 90° such that the walls of the cells are not perpendicular to the general plane of the resulting honeycomb panel 38.

The expanded metal technique is practically impossible to transpose to composite materials. They do not have the same capacity as metal for plastic deformation. Expanding layers of cloth prior to densification and rigidification runs a high risk of tearing the cloth at the ends of the cuts, and gives rise to a problem of holding the expanded cloth in shape. In addition, that method suffers from a major limitation as to the thickness of the honeycomb panel that can be obtained. This thickness is determined by the distance between the lines of cuts, and it must be sufficiently small to ensure that expansion can be achieved fairly easily.

SUMMARY OF THE INVENTION

An object of the present invention is thus to provide a method enabling a honeycomb structure to be made of thermo-structural composite material without encountering the above drawbacks.

In particular, an object of the invention is to provide a method whereby honeycomb structures of thermostructural composite material can be made at a cost that is low enough to open up wide areas of application.

This object is achieved by a method of manufacturing a honeycomb structure of thermostructural composite material comprising a fiber reinforcing fabric densified by a matrix, the fibers of the reinforcing fabric being of a material selected from carbon and ceramics, as is the matrix, the method comprising the following steps:

making a three-dimensional fiber fabric by means of superposed two-dimensional plies that are bonded together by means of fibers passing through the plies;

making slit-shaped cuts in a staggered configuration through the plies, and through the entire thickness of the fabric;

stretching the cut fabric in a direction that is not parallel to the cuts but that is parallel to the plies so as to form cells whose walls are constituted by the lips of the cuts; and while the cut texture is held in the stretched state, densifying it using the matrix-constituting material to obtain a rigid honeycomb structure of thermostructural material.

The plies forming the reinforcing fabric may be constituted, at least in part, by layers of cloth. Bonding between the plies is achieved, for example, by implanting threads, by sewing, or by needling. When needling plies that comprise layers of cloth, it may be advantageous to interpose therebetween plies made of fiber webs so as to provide a source of fibers suitable for being taken by the needles to be placed transversely through the plies during needling.

Fiber reinforcing fabrics formed by superposed two-dimensional plies that are bonded together by needling, for example, are well known.

The method of the invention is remarkable, in particular, in that a preform for a honeycomb structure is obtained simply by forming staggered cuts and by stretching the fabric.

This method differs from that shown in FIGS. 1A to 1C in that, according to the invention, the stretching takes place parallel to the planes of the plies and not perpendicularly thereto.

The method of the invention also differs from that shown in FIGS. 3A and 3B. With the prior method, the walls of the cells are constituted by portions of the sheet situated between two lines of cuts. Expansion has the effect of causing these walls to be inclined relative to the initial plane of the sheet as the sheet is made larger. This is not true of the method of the present invention. The effect of stretching the fabric is to move apart the lips of each cut so as to form cells whose walls are formed by the lips of the cuts. The thickness of the honeycomb structure is determined by the thickness of the fiber fabric and therefore does not suffer from the same limitation as occurs in the method shown in FIGS. 3A and 3B where the thickness of the honeycomb structure is determined by the (necessarily limited) distance between pairs of adjacent lines of cuts.

The invention also provides a honeycomb structure of thermostructural composite material as can be obtained by the above-defined method.

According to the invention, such a structure comprising a fiber reinforcing fabric densified by a matrix is characterized in that the reinforcing fabric is a three-dimensional fabric formed by two-dimensional plies bonded together by fibers passing through the plies, the cells of the honeycomb structure being formed through the plies.

Other features and advantages of the method and of the structure of the present invention appear on reading the following description given by way of non-limiting indication.

BRIEF DESCRIPTION OF THE DRAWINGS

Reference is made to the accompanying drawings, in which:

FIGS. 1A, 1B, and 1C, described above, show a prior art method of making a honeycomb structure;

FIGS. 2A and 2B described above, show another prior art method of making a honeycomb structure;

FIGS. 3A and 3B, described above, show yet another prior art method of making a honeycomb structure;

FIGS. 4A to 4F show various successive steps in one implementation of the method of the invention for manufacturing a plane honeycomb fabric of thermostructural composite material;

FIGS. 5A to 5C show how a skin can be formed on a honeycomb structure to make a panel; and FIGS. 6A and 6B show another implementation of the method of the invention for making a cylindrical honeycomb structure.

DESCRIPTION OF THE PREFERRED EMBODIMENTS

A method of the invention for making a plane honeycomb structure of thermostructural composite material of the carbon/carbon type is now described with reference to FIGS. 4A to 4F.

A first step in the method consists in making a three-dimensional reinforcing fabric of carbon fibers.

To this end, two-dimensional plies 40 of carbon or of a carbon precursor (e.g. polyacrylonitrile or "PAN" in the pre-oxidized state) are superposed and needled together (FIG. 4A). The plies 40 are layers, e.g. of woven cloth or of a complex made up of cloth and fiber web with the fiber web providing fibers that are easily taken by the needles during needling so as to be implanted through the plies. The plies 40 could also be constituted by single-directional sheets, such as sheets of mutually parallel cables or yarns. In particular, each ply could be constituted by three pre-needled single-directional sheets with the directions of the three sheets being at angles of 60° to one another.

Needling is preferably performed on fibers in the carbon-precursor state, since needling performed directly on carbon fibers has a more destructive effect. Needling may be performed progressively while the stack of plies 40 is being built up, using the method described in Japanese Patent Application filed under No 61-149880 on Jun. 27, 1986, with the thickness of the fabric being determined as a function of the thickness of the honeycomb structure to be made.

Other techniques may be used for bonding the plies together, e.g. sewing, or else implanting threads as described in U.S. Pat. No 4,628,846.

When the three-dimensional fabric 41 obtained in this way is made of carbon-precursor fibers, carbonizing heat treatment must be performed to transform the precursor into carbon. Since such treatment gives rise to a small amount of shrinkage, it is preferably performed before cuts or slits are made in the fabric for the purpose of forming the cells in the honeycomb structure.

As shown in FIG. 4B, these slit-shaped cuts 42 are made in a staggered configuration, with the sizes and positions thereof defining the sizes and shapes of the cells. The cuts 42 are made in planes that are mutually parallel and perpendicular to the planes of the plies 40.

The planes of the cuts may be parallel to one of the directions X and Y along which the warp threads and the weft threads of the cloth in the plies 40 extend, e.g. along the warp thread direction X (with the layers of cloth being superposed so that their warp threads are parallel, and consequently so that their weft threads are also parallel). As a result, continuity of the warp threads (or of the weft threads) is conserved in the plies of cloth after the cuts have been made. However, this is not always necessary. The planes of the cuts may intersect both directions X and Y and the layers of cloth may be superposed so that their warp (and weft) threads are not parallel, without damaging the strength of the cut fabric nor its capacity for deformation.

In the example shown, the cuts all have the same length L and they are regularly spaced apart, being separated by the same distance D in each plane. The planes themselves are regularly spaced apart with the distance between planes or pitch being d. The length L of the cuts is greater than the length D of the gaps between the cuts and the staggered disposition in the example shown is such that the middle of a cut 42 in one plane of cuts is level with the middle of the gap between two cuts 42 in the adjacent planes of cuts.

The cuts 42 may be made, for example, using a blade or a water jet.

After the cuts have been made, the fabric 41 is stretched in the direction perpendicular to the planes of the cuts (arrows F in FIG. 4C). Stretching causes the lips of the cuts 42 to move apart (FIG. 4C), thereby forming cells 46 whose walls are defined by the lips. Stretching is stopped when the cells 46 have achieved the desired shape (FIG. 4D) and before the stresses exerted at the ends of the cuts cause the fabric to tear.

It may be observed that the fabric can be stretched in a direction that is inclined relative to the planes of the cuts, i.e. in a direction that is not necessarily perpendicular thereto.

A honeycomb fiber preform 47 is thus obtained in which the walls of the cells 46 are perpendicular to the planes of the plies 40.

It is possible to make the cuts 42 in planes that are inclined relative to the normal to the plies 40. After stretching, cells are then obtained whose walls are not perpendicular to the faces of the fabric.

Tests performed on fabrics as described above have shown that during stretching the walls of the cells remain perpendicular to the planes of the plies and that surface deformations, in particular as occur in the end regions of the cuts, remain very small in amplitude. It has also been observed that stretching does not cause tearing at the ends of the cuts. By way of comparison, tests performed on fabrics that are identical except for needling (no bonding between plies) have shown that stretching can cause damage to the fabric at the ends of the cuts.

It should be observed that the capacity of the fabric 41 for deformation under traction parallel to the plies is surprising insofar as cloth has the reputation of being undeformable in its own plane.

After stretching, the preform 47 is densified while being held in the stretched state by means of a jig. The jig (FIG. 4E) is constituted by a graphite soleplate 50 and graphite pegs 52 extending into cells 46 along the edges of the preform and disposed in opposite positions in the Y direction. The pegs 52 penetrate into holes formed in the soleplate 50.

The assembly constituted by the jig 50, 52 and the preform 47 is placed in an oven in which the preform 47 is densified by carbon by means of chemical vapor infiltration. In conventional manner, a gas containing one or more hydrocarbons is injected into the enclosure under conditions of temperature and pressure that are determined to facilitate decomposition of the gas on coming into contact with the fibers of the preform 47, thereby releasing carbon which progressively fills up the pores in the preform 47.

After densification, a honeycomb structure 48 of carbon/carbon composite is obtained (FIG. 4F). There are numerous applications for such a structure. For example, it may constitute a soleplate for a heat treatment oven, advantageously replacing a metal soleplate obtained by casting or by welding elements together. Such a honeycomb structure may also be used as a rigid jig for holding a preform that is to be densified by chemical vapor infiltration, replacing a conventional graphite jig.

Honeycomb structures of thermostructural composite material have other applications, e.g. in making up planes suitable for use in aviation or space applications, e.g. as structural components of space airplanes.

In some applications, the honeycomb structure may be provided with a skin on each face.

To this end, as shown in FIG. 5A, at least one fiber layer 54, e.g. a layer of cloth, is tensioned over the preform 47 while still held on the soleplate 50 by means of the pegs 52. The layer of cloth 54 is needled to the edges of the cells 46 using a needling head whose displacements can be programmed, e.g. as described in French Patent Application No 2,669,941.

After the layer 54 has been needled to the cells, a graphite soleplate 51 analogous to the soleplate 50 is placed on the preform 47 together with its layer of cloth 54, the soleplate 51 having holes appropriately placed for receiving the top ends of the pegs 52 which stand proud of the preform 47. The assembly is turned over, and the soleplate 50 is removed so as to allow at least one other layer of cloth 55 to be tensioned over the other face of the preform 47 and to enable said other layer to be needled in place (FIG. 5B).

The assembly is then inserted in a chemical vapor infiltration furnace so as to densify the preform 47 simultaneously with the layers of cloth 54 and 55 needled to its two faces, thus making it possible to obtain a panel 58 comprising a rigid honeycomb core 48 covered by two rigid skins 56 and 57 that close the cells 46 (FIG. 5C).

When the panel being made is not going to be subjected to large shear forces, the layers of cloth 54 and 55 may merely be glued to the faces of the preform 47 prior to being densified together therewith, such that co-densification provides the additional bonding required between the skin and the core of the panel.

In the above description, the composite material used for making the honeycomb structure is a carbon/carbon composite.

However, the invention is naturally applicable to making honeycomb structures of thermostructural composite materials other than carbon/carbon composites, and in particular composites having a ceramic matrix with a reinforcing structure that is made of carbon or of ceramic. The techniques implemented are known techniques for making three-dimensional fabrics of carbon fibers or of ceramic fibers, and for densification by means of a ceramic matrix.

It may also be observed that a honeycomb preform optionally fitted with fiber layers on its faces may be densified by a liquid method, i.e. by being impregnated with a liquid precursor of the matrix, and then transforming the precursor. Several impregnation cycles may be necessary, optionally together with a chemical vapor infiltration cycle.

Finally, although the honeycomb structures in the above description are plane, the invention is applicable to making structures that are curved, cylindrical, or even conical. Such structures may be obtained by shaping the honeycomb preform on an appropriate jig, prior to densification and rigidification. For a honeycomb structure that is conical or frustoconical, the cuts may be formed in the fiber fabric at a varying pitch such that after the fabric has been stretched and shaped, the resulting cells are of substantially the same size. The term "varying pitch" is used to indicate that the distance between adjacent planes of cuts varies from one side of the fabric to the opposite side.

It is also possible to make a cylindrical three-dimensional reinforcing fabric 61 by needling together plies 60 that have been wound on a mandrel (FIG. 6A) as described in Japanese Patent Application ruled under No 61-149881 on Jun. 27, 1986, for example. Cuts 62 are formed in a staggered configuration along meridian planes through the entire thickness of the fabric 61.

The cut fabric is stretched onto a mandrel 70 of diameter that is greater than that of the mandrel 60, thereby forming the cells 66. Pegs 72 implanted in the mandrel 70 hold the fabric in its stretched state for densification purposes, e.g. chemical vapor infiltration (FIG. 6B). After densification, a rigid cylindrical honeycomb structure is obtained.

FIG. 6A shows cuts formed in meridian planes. In a variant, it is possible to form cuts in a staggered configuration in planes that are perpendicular to the axis of the fiber fabric. Cells are then obtained by stretching the fabric parallel to its axis.

What is claimed is:

1. A honeycomb structure of thermostructural composite material comprising a fiber reinforcing fabric densified by a matrix, the fibers of the reinforcing fabric and the matrix being of a material selected from the group consisting of carbon and ceramics, wherein the reinforcing fabric is a three-dimensional fabric formed by superposed two-dimensional plies bonded together by fibers passing through the plies, and wherein the honeycomb structure shows cells having walls formed from cuts extending through the entire thickness of the fabric.

2. A honeycomb structure according to claim 1, wherein the two dimensional plies comprise layers of cloth.

3. A honeycomb structure according to claim 1, wherein the two-dimensional plies comprise single-directional sheets having directions that are inclined relative to one another.

4. A honeycomb structure according to claim 1 further comprising two rigid skins covering faces of the structure parallel to the plies of the reinforcing fabric and closing the cells.

* * * * *